Feb. 6, 1934.   F. PILLEY   1,945,788
EGG BREAKING MACHINE
Filed May 4, 1929   11 Sheets-Sheet 1
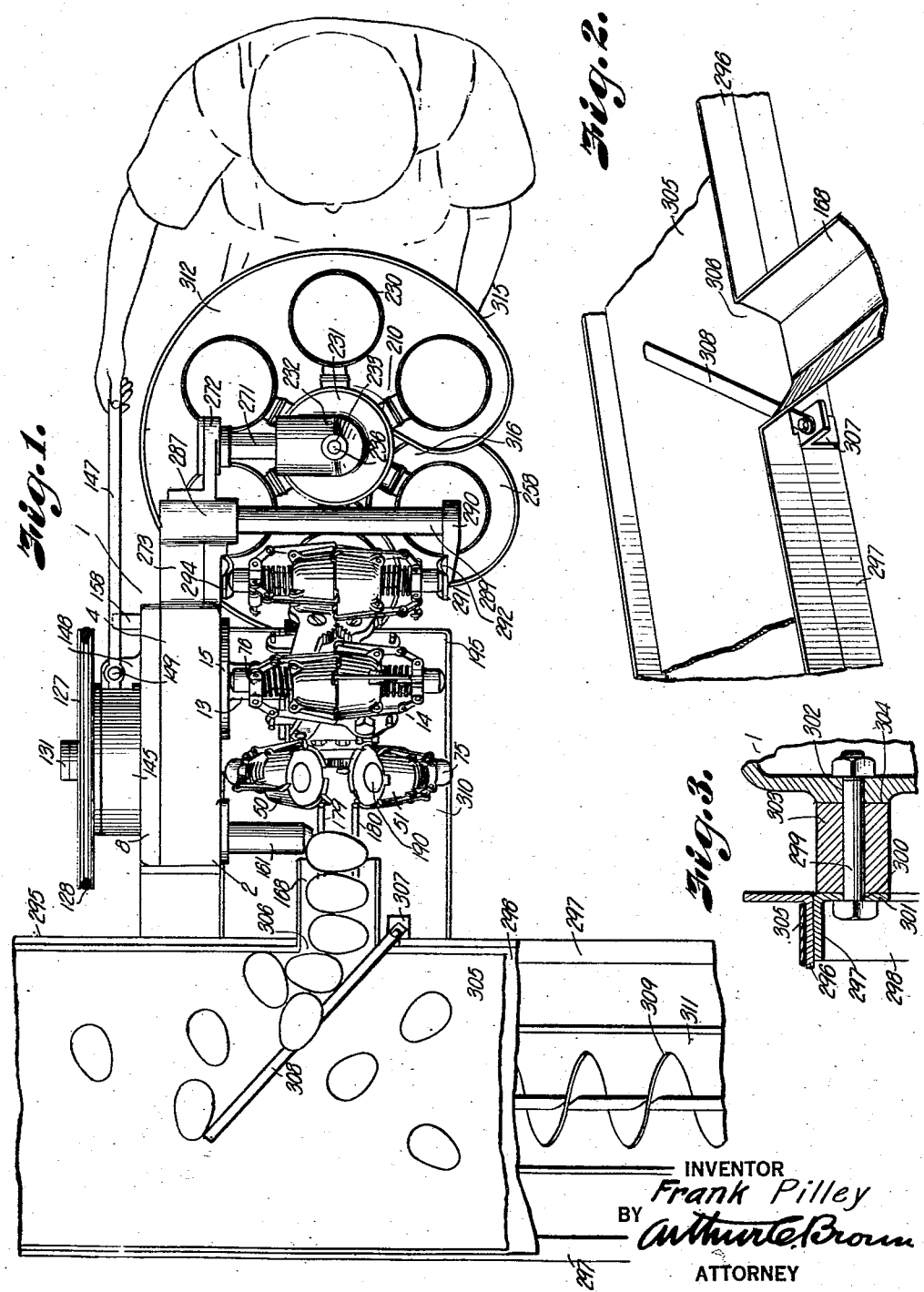
INVENTOR
Frank Pilley
BY
ATTORNEY Feb. 6, 1934.  F. PILLEY  1,945,788
EGG BREAKING MACHINE
Filed May 4, 1929   11 Sheets-Sheet 2
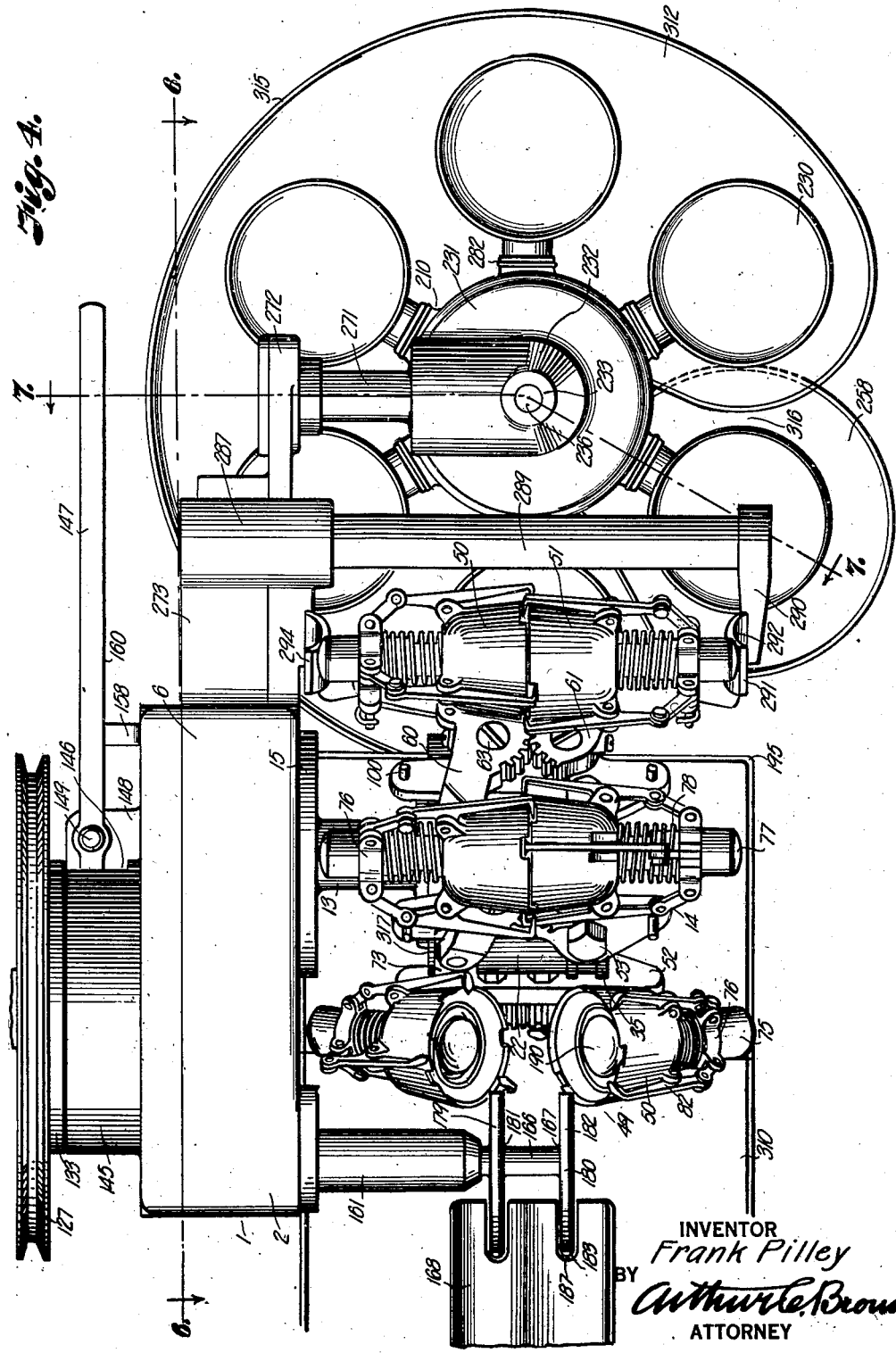
INVENTOR
Frank Pilley
BY
Arthur C. Brown
ATTORNEY Feb. 6, 1934.   F. PILLEY   1,945,788

EGG BREAKING MACHINE

Filed May 4, 1929   11 Sheets-Sheet 3

INVENTOR
Frank Pilley
BY
Arthur C. Brown
ATTORNEY

Feb. 6, 1934.   F. PILLEY   1,945,788
EGG BREAKING MACHINE
Filed May 4, 1929   11 Sheets-Sheet 4

INVENTOR
Frank Pilley
BY
ATTORNEY

Feb. 6, 1934.   F. PILLEY   1,945,788
EGG BREAKING MACHINE
Filed May 4, 1929   11 Sheets-Sheet 5

INVENTOR
*Frank Pilley*
BY *Arthur C. Brown*
ATTORNEY

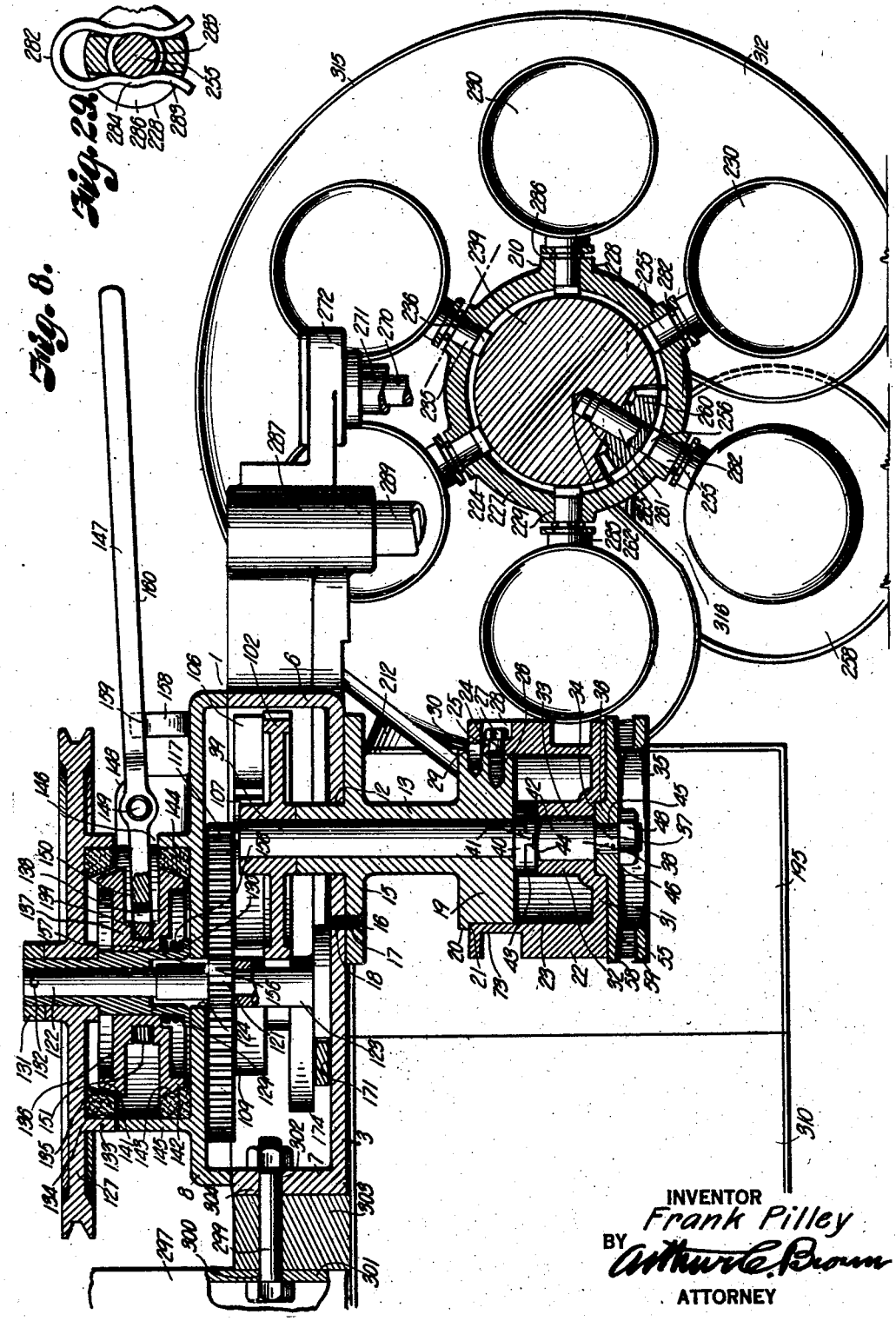

Feb. 6, 1934.　　　　　F. PILLEY　　　　　1,945,788
EGG BREAKING MACHINE
Filed May 4, 1929　　　11 Sheets-Sheet 7
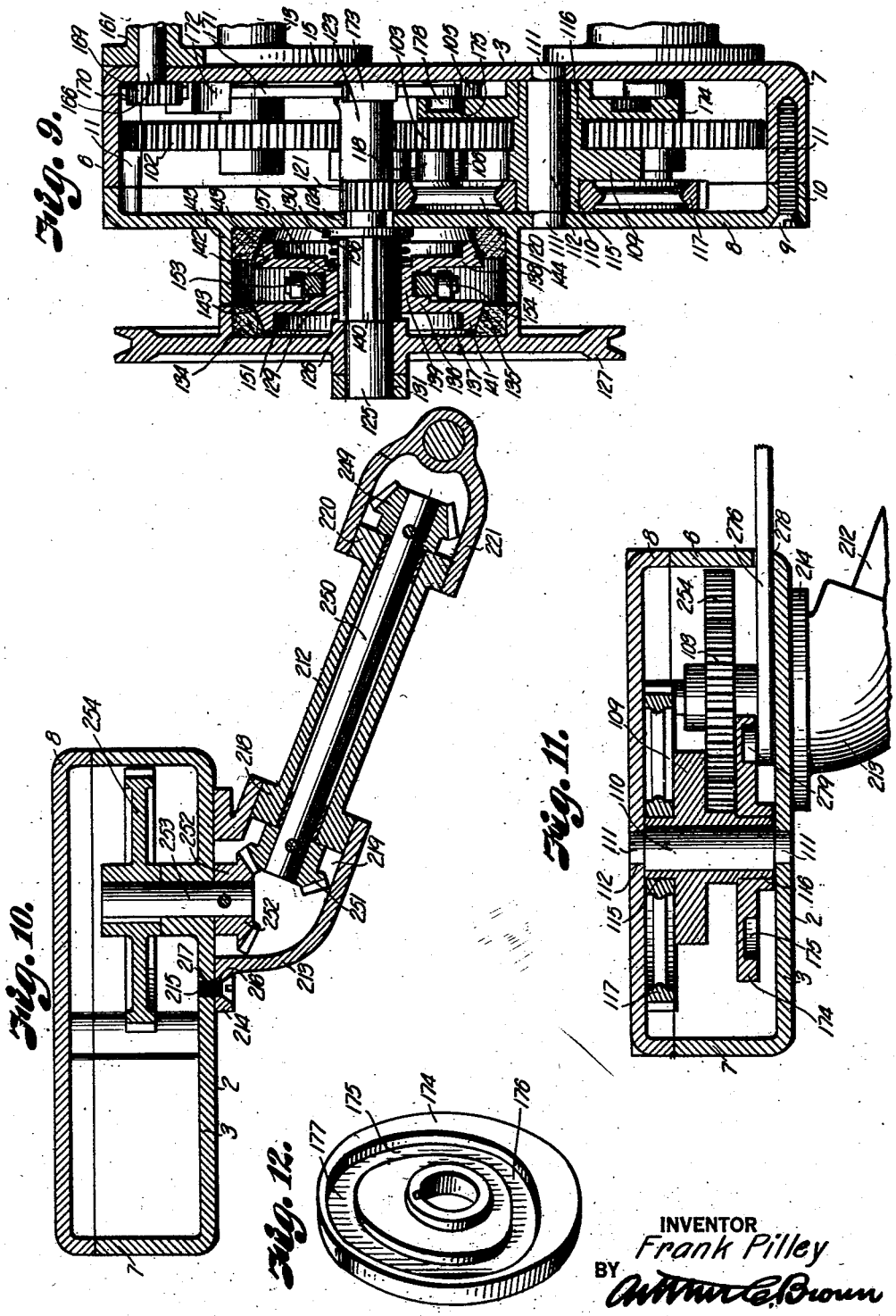
INVENTOR
Frank Pilley
BY
ATTORNEY

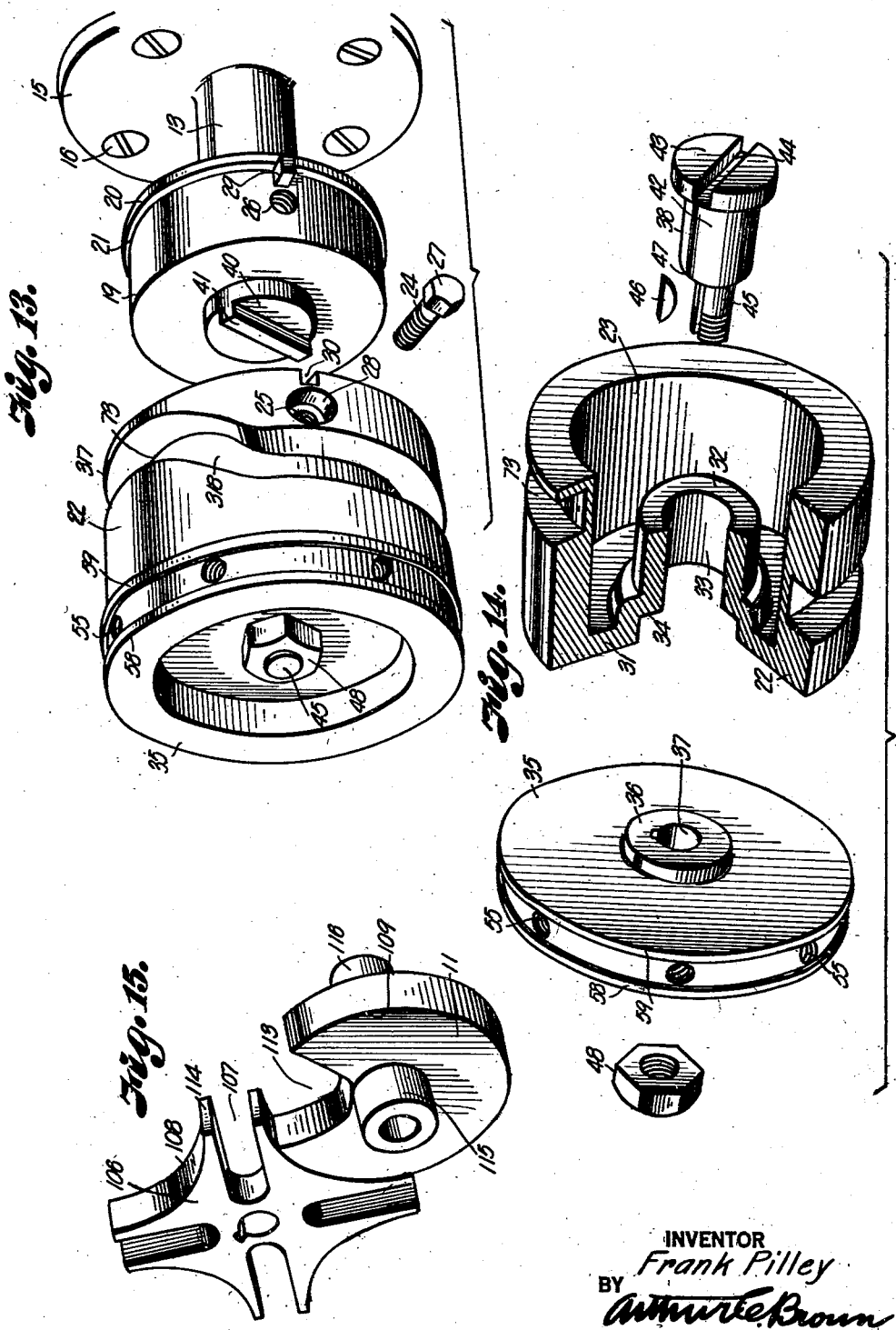

Feb. 6, 1934.                F. PILLEY                  1,945,788
                         EGG BREAKING MACHINE
                         Filed May 4, 1929        11 Sheets-Sheet 9
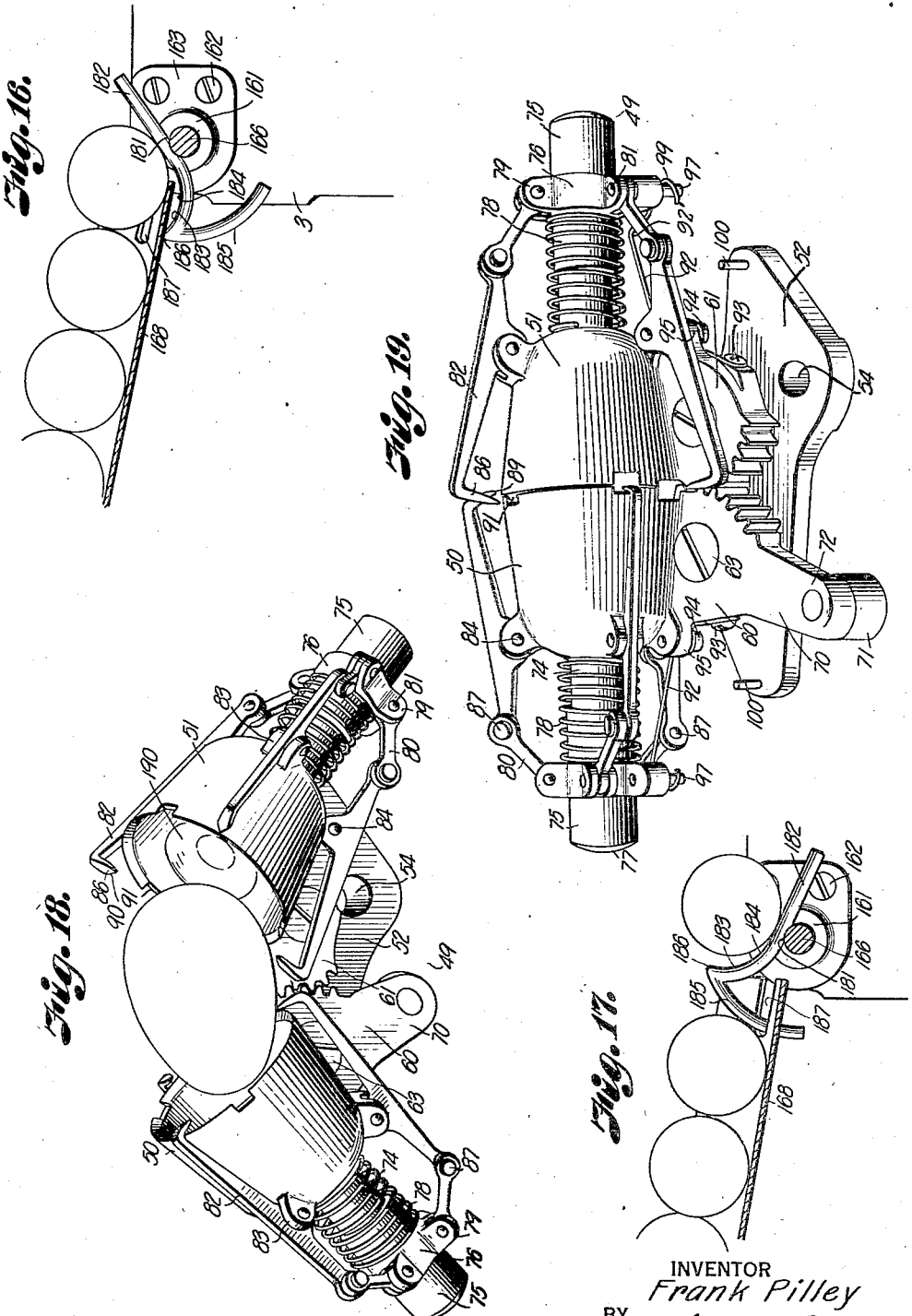
INVENTOR
*Frank Pilley*
BY
ATTORNEY Feb. 6, 1934.  F. PILLEY  1,945,788
EGG BREAKING MACHINE
Filed May 4, 1929  11 Sheets-Sheet 10
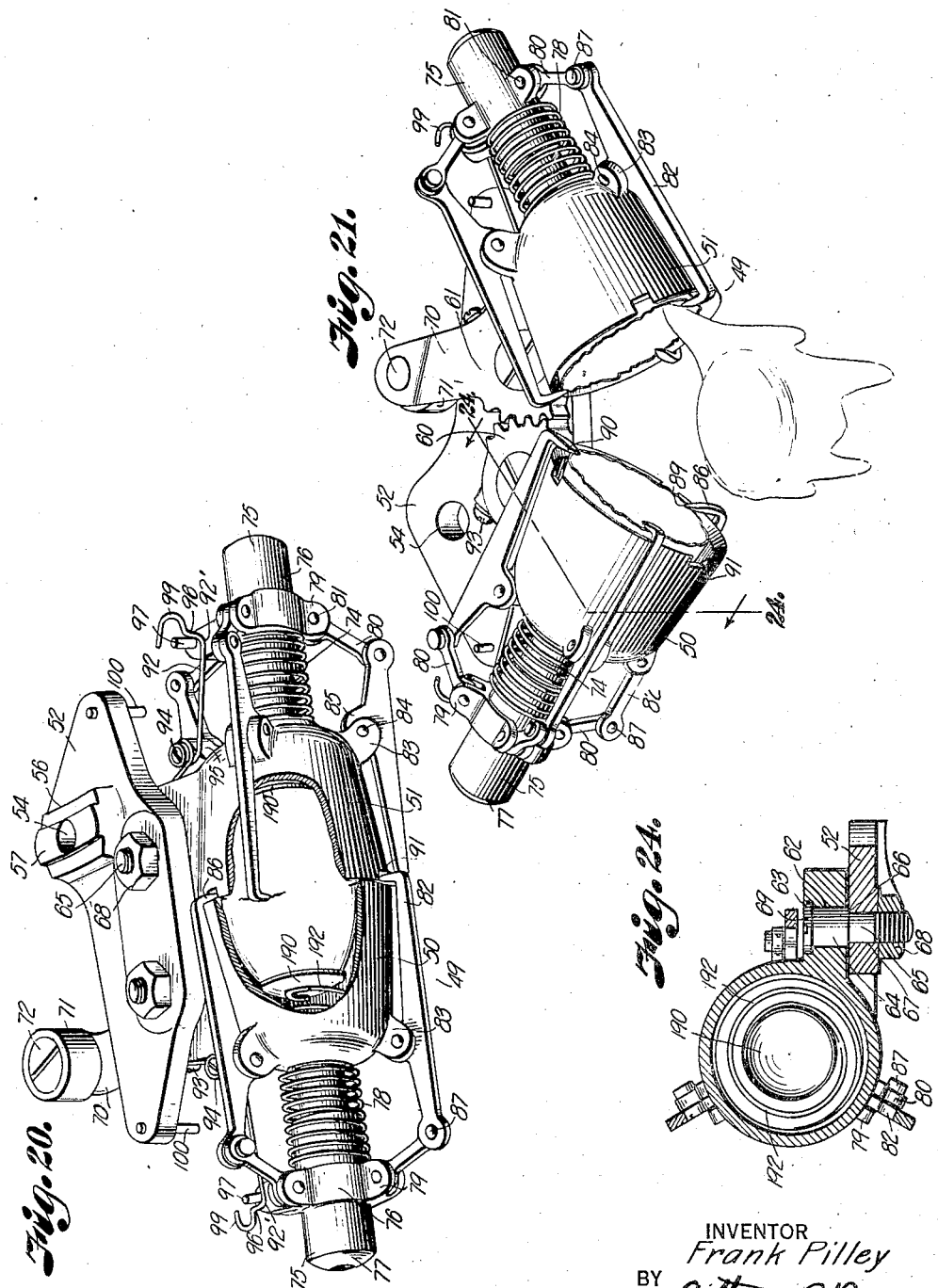
INVENTOR
Frank Pilley
BY Arthur C. Brown
ATTORNEY

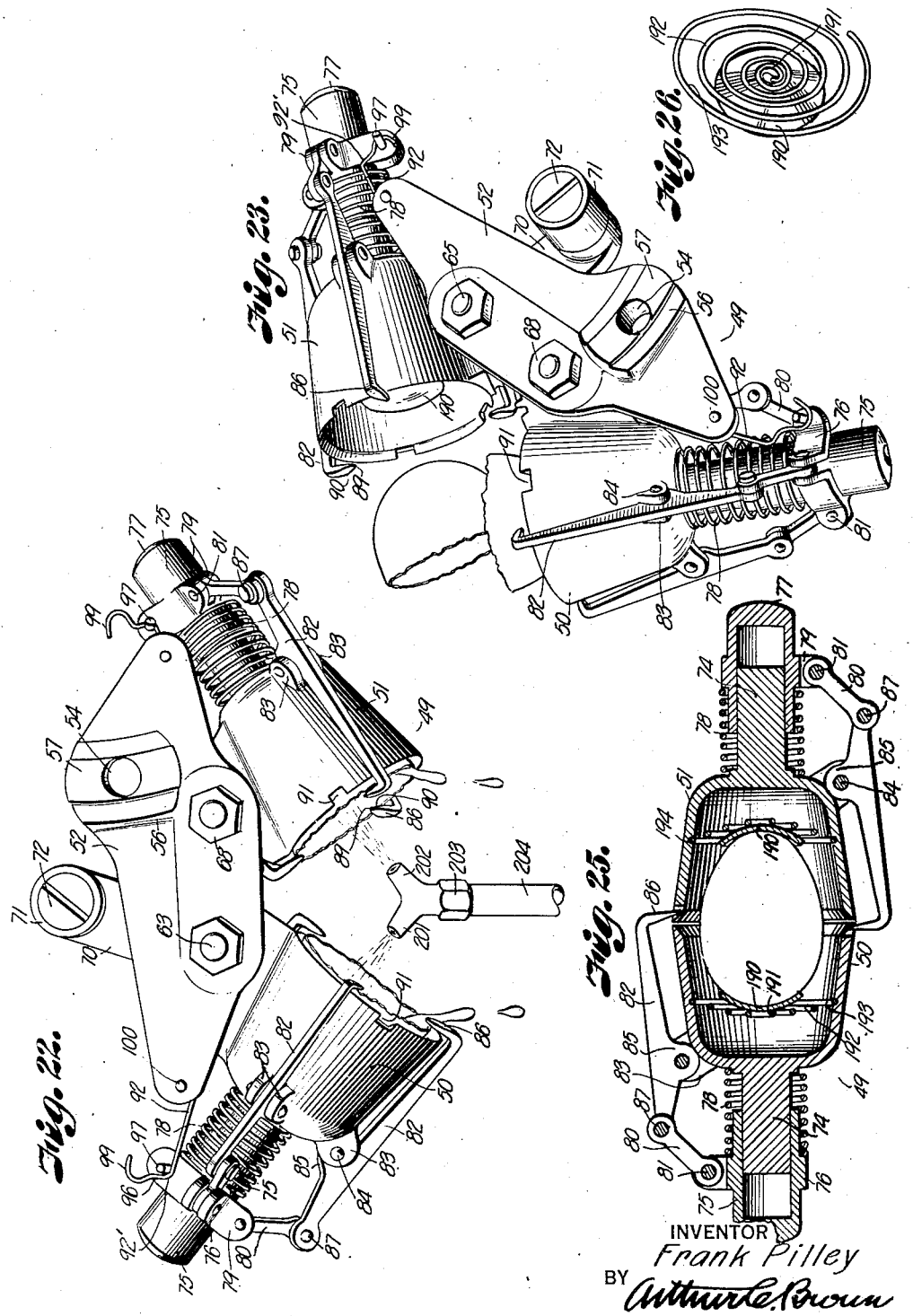

Patented Feb. 6, 1934

1,945,788

UNITED STATES PATENT OFFICE 1,945,788

EGG BREAKING MACHINE

Frank Pilley, Kansas City, Mo., assignor, by mesne assignments, to Borden's Produce Company, Inc., New York, N. Y., a corporation of Delaware Application May 4, 1929. Serial No. 360,396

51 Claims. (Cl. 146—2)

This invention relates to egg handling machines and more particularly to a machine for automatically breaking eggs and separating the contents thereof from the shells.

The principal objects of the invention are to prevent the wastage of edible contents of the egg incidental to the ordinary hand separation, and to eliminate unnecessary handling of the eggs by the operator, thereby effecting a saving in time and labor and at the same time providing a more sanitary method of breaking the eggs.

It is a further object of the invention to provide a machine in which the operating mechanism and inspection cups may be readily removed from the machine for sterilization.

Another object of the invention is to pass the broken eggs before the view of the operator for nspection and removal of those of inferior quality before they are discharged into the mixing vat.

It is also an object of this invention to regulate automatic delivery of the eggs from a conveyor to the machine according to its capacity.

In accomplishing these and other objects of the invention, I have provided improved details of structure, the preferred form of which is shown in the accompanying drawings, wherein:

Fig. 1 is a plan view of an egg breaking machine associated with an egg conveyor, and illustrating discharge of eggs from the conveyor into the machine.

Fig. 2 is an enlarged detailed perspective view of the conveyor and the means for deflecting the eggs from the conveyor into the machine.

Fig. 3 is a sectional view through a portion of the conveyor frame and the machine housing, illustrating attachment of the machine to the conveyor frame.

Fig. 4 is an enlarged plan view of the machine.

Fig. 7 is a vertical sectional view through the machine on the line 7—7, Fig. 4.

Fig. 8 is a horizontal sectional view on the line 8—8, Fig. 5.

Fig. 9 is a vertical sectional view through the transmission housing.

Fig. 10 is a horizontal sectional view of the transmission housing, particularly illustrating the drive shaft for rotating the turret carrying the egg inspection cups.

Fig. 11 is a horizontal sectional view through the transmission, particularly illustrating the cam for operating mechanism timing feed of eggs into the machine, and for operating the mechanism emptying the egg contents from the inspection cups.

Fig. 12 is a detail perspective view of the cam.

Fig. 13 is a detail perspective view of the cup carrying member removed from its supporting head, particularly illustrating the drive shaft therefor.

Fig. 14 is a disassembled perspective view of the cup carrying member, part of the cup operating cam member being broken away to better illustrate its construction.

Fig. 15 is a detail perspective view of the Geneva stop members for timing movement of the breaker dial and the inspection cup turret.

Fig. 16 is a sectional view through the egg delivery chute and egg carrier for timing delivery of eggs into the egg receiving cups, showing the loading member in position to receive an egg from the chute.

Fig. 17 is a similar view illustrating the egg loader as discharging an egg into a pair of opened cups.

Fig. 18 is an enlarged detail perspective view of a pair of egg cups in open position and receiving an egg.

Fig. 19 is a view of the cups after they have received the egg and have been moved to closed position.

Fig. 20 is a similar view of the cups showing the egg shell piercing fingers for impaling the egg, parts of the cups being broken away to better illustrate the function of the piercing fingers.

Fig. 21 is a view of the cups shown in open position discharging the contents of the egg and showing the fingers in position to retain the severed egg shells in the cup.

Fig. 22 is a view of the cups as they pass the air nozzle, illustrating the method of removing the remaining contents of the eggs from the shells.

Fig. 23 is a view of the cups showing the shell piercing fingers released for discharging the egg shells from the cups.

Fig. 24 is a cross sectional view through one of the cups on the line 24—24 of Fig. 21, particularly illustrating the pivotal mounting of the cup on its supporting plate.

Fig. 25 is a longitudinal sectional view through a pair of cups in closed position and retaining an egg suspended therein.

Fig. 26 is a detail perspective view of one of the egg supporting disks, particularly illustrating its spring mounting.

Fig. 27 is a perspective view of the turret shaft carrying the disk for retaining the inspection cups in vertical position, and the gear for rotating the cups, one of the cups being shown in spaced relation.

Fig. 28 is a similar view showing the cup rotating gear partially rotated.

Fig. 29 is a section through a cup carrying trunnion and its mounting on the inspection turret.

Figure 5:
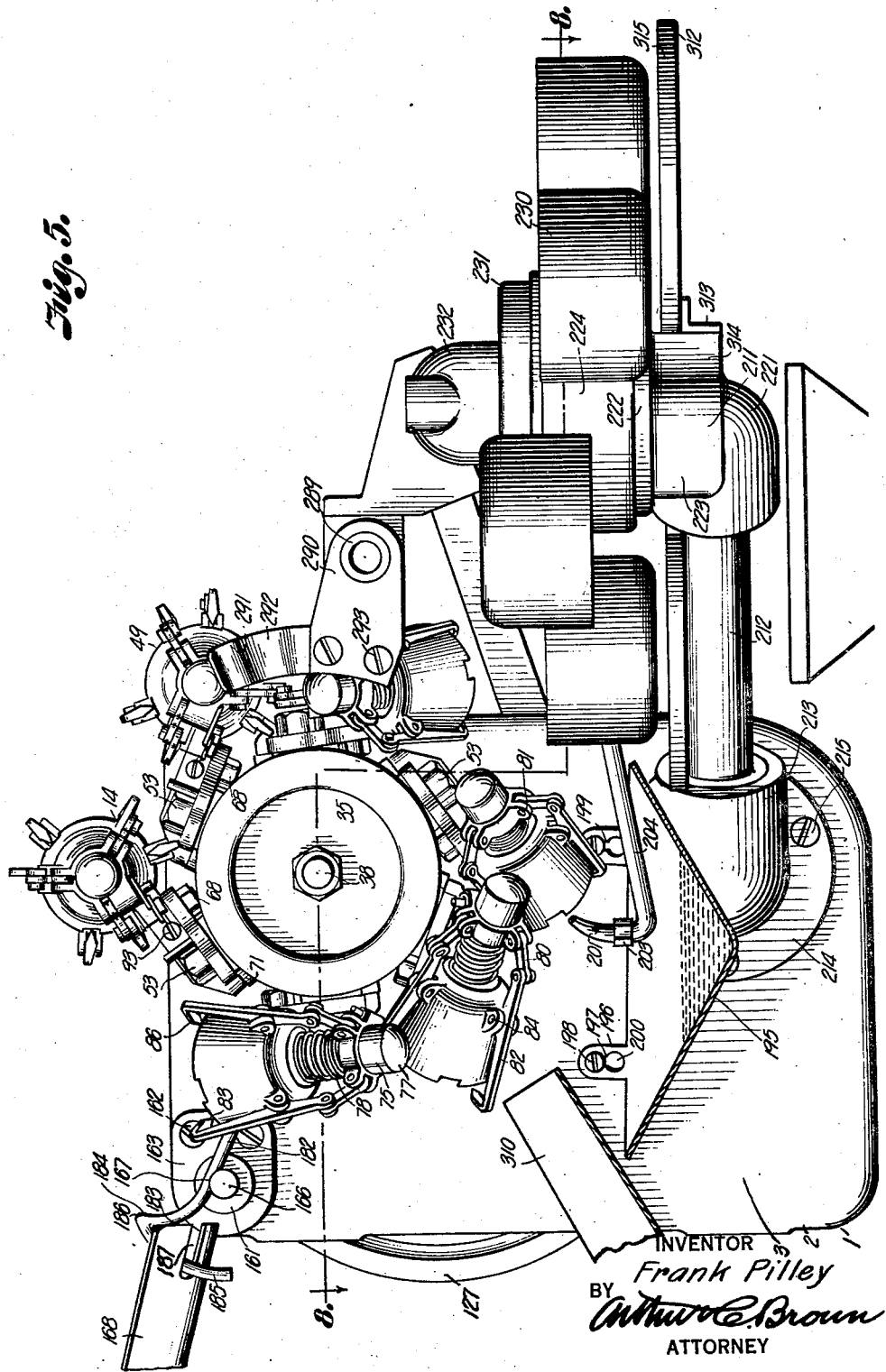
Fig. 5 is a side elevational view of the machine.

Referring more in detail to the drawings:

1 designates a housing for enclosing transmission mechanism for driving the various operating elements in the machine, and comprising a substantially rectangular-shaped casting 2, including a side wall 3, top and bottom walls 4 and 5, and front and back walls 6 and 7, a side or cover plate 8 being secured to the walls 4, 5, 6 and 7 by screws 9 projecting through openings 10 in the cover, and through threaded bosses 11 formed interiorly of the case.

Mounted on the side wall 3 and projecting through an opening 12 therein is a tubular bracket 13 for mounting the cup carrying dial member 14, the bracket 13 being provided with a peripheral flange 15 for attaching it to the transmission housing by screws 16 which are projected through openings 17 in the flange and into threaded openings 18 formed in the side plate 3. Also formed on the bracket at its outer end is a cylindrical head 19 having a peripheral flange 20 on its side adjacent the housing for forming a stop shoulder 21 for the cup dial element 14.

Sleeved on the head 19 and abutting against the stop shoulder 21 is a cam drum 22. The drum 22 is removably mounted on the head 19 and comprises a cylindrical casting having an internal bore 23 of suitable diameter for snugly receiving the head, and is secured thereto by a cap screw 24 which is projected through an opening 25 formed in the periphery of the drum, and is threaded into an opening 26 formed in the periphery of the head 19, the head 27 of the screw being preferably seated in a counter bore 28 below the periphery of the drum.

In order to secure correct position of the drum in relation to its supporting head, I provide the head adjacent the flange 20 with a key member 29 which is received in a notch 30 formed in the drum adjacent the screw opening 25 so that when the drum is applied on the head the drum is positioned by the head thereby, and the retaining screw 24 may be readily inserted in the opening 26.

The forward end of the drum is closed by a diaphragm 31 provided on its inner face with a boss 32 projecting inwardly of the drum and which is provided with a central bore 33, and the outer face of the diaphragm is counter bored as at 34.

Received in concentric juxtaposition with the outer end of the drum is a disk 35 of slightly larger diameter than the cam drum and provided on its inner face with a cylindrical boss 36 of sufficient diameter to be snugly received within the counter bore 34 for centering the disk with relation to the drum. The disk is also provided with a central opening 37 for anchoring a drive member 38 later described.

Extending through the tubular bracket 13 is a drive shaft 39 provided with a disk-shaped head 40, abutting against the forward face of the head 19, and with a key 41 extending diametrically across the front face thereof for establishing driving connection with the driving member 38.

The driving member 38 comprises a cylindrical portion 42 rotatably received in the bore 33 of the cam drum 22, and formed integral with its inner end is a disk-shaped head 43 complementary to the disk-shaped head 40, the disk 43 being provided with a groove 44 extending diametrically across its face to receive the key 41 on the member 40. The opposite end of the driving member 38 is provided with a reduced portion 45 of sufficient diameter to be received in the opening 37 of the disk 35 which is keyed thereto by a spline 46.

The disk 35 is retained against the shoulder 47 formed by the reduced portion 45 by means of a jamb nut 48 that is threaded on the extension 45 of the drive member 38. Thus, it is apparent that when the shaft 39 is rotated, as hereinafter described, it will rotate the driving member 38 through the clutch disks 40 and 43, and the drive member 38, being retained in the cam drum 22 on the bracket 13, will rotate the disk 35.

Mounted on the periphery of the disk 35 are a plurality of egg members or cups, generally designated 49, the machine here illustrated being provided with six pairs of retaining members, all of which are of identical construction, and, therefore, only one of the pairs will be described in detail.

Each pair of egg receiving cups comprises bell-shaped members 50 and 51 pivoted to a plate 52 mounted transversely of the disk 35 and secured thereto by a cap screw 53 which projects through an opening 54 in the plate and is threaded into one of a series of threaded openings 55 provided in the periphery of the disk 35, the plate being retained against rocking movement on the disk by a boss 56 formed integrally of the plate, and provided with a depending arcuate rib 57 of sufficient width to be snugly received between the flanges 58 and 59 projecting from the periphery of the disk adjacent its opposite sides.

The bell-shaped cups 50 and 51 are provided with integral gear segments 60 and 61 projecting laterally from the sides thereof and provided with openings 62 receiving members 63 for pivoting the cups on the plate 52.

The pivot members 63 comprise cylindrical body portions 64 which are received in the openings 62, and the body portions 64 are provided with reduced shanks 65 forming shoulders 66, which engage the plates 52 when the shanks are projected through openings 67 formed therein. The shanks are retained in the plate by nuts 68 threaded on the ends of the shanks, as best shown in Fig. 24.

The upper end of the pivot members are provided with flanged heads 69 which are received in counter bores of the gear segments so that when the pivot members are inserted through the gear segments and through the openings in the plate, and the nuts 68 tightened to draw the shoulder 66 against the plate, the egg cups are retained on the pivot members by the heads 69.

The gear segments 60 and 61 are so related and the teeth intermeshed that the open ends of the cups are normally facing each other and whereby pivotal movement of one of the cups in one direction causes a corresponding movement of the other cup in the opposite direction.

In order to actuate the cups, I provide the segment 60 with a rearwardly trailing arm 70, having a roller 71 rotatably mounted on a pin 72 carried by the arm, the roller 71 tracking in a cam groove 73 formed in the periphery of the drum 22, and shaped to cause movement of the cups to open and closed position as they are carried about the drum by the disk 35, as later described. Projecting from the closed ends of the cups are stub shafts 74 on which are slidably mounted finger actuating sleeves 75 carrying integral collars 76 formed on the sleeves, and having an inner diameter adapted to slidably receive the stub shaft 74. The ends of the sleeves are closed and provided with, substantially semi-spherically shaped ends 77 adapted for engagement with cam plates, later described, to move the collars longitudinally on the stub shafts against the tension of the coil springs 78, one end of spring 78 bearing against the end of a cup and the other end against the collar to retain the collar in its normal outermost position.

The collars 75 are provided with a plurality of pairs of ears 79 and between each pair of ears is mounted a link 80 pivoted on a pin 81 extending through the ears.

The free ends of the links 80 are connected with egg engaging and impaling fingers 82 which are pivoted to ears 83, projecting radially from the periphery of the egg cups in substantial alignment with the ears 79, the fingers being pivotally connected with the ears 83 by pins 84 projecting through the ears, and a depending ear 85 on the lower edge of the fingers. The fingers project longitudinally of the egg cups and are provided with laterally directed knife portions 86 projecting radially toward the center of the cups. The rear ends of the fingers are connected with the free ends of the links by pins 87 which project through the links and through the end of the fingers, as best shown in Fig. 25.

In the present illustration I have shown each cup provided with three fingers substantially equally spaced about the periphery of the cups with the fingers of one cup in slightly staggered relation to the fingers of the other cup. However, I may find it desirable to provide a different number of fingers in order to better accomplish the purpose for which they are intended.

The knife portions of the fingers are preferably pointed on their ends as at 89, and the converging side edges 90 are preferably ground to an edge so that the fingers will readily pierce the egg shell as later described.

The rim of each cup opposite the fingers on the other cup is notched as at 91 to allow the knife portion to be projected within the cups when the cups are in closed position and supporting an egg.

In order to control the fingers at various positions of the cups to retain the fingers in shell impaling position, and for releasing the fingers to release the shells, I provide each cup with a latch spring 92 consisting of spring wire having one end anchored to a screw 93 threaded into the periphery of a gear segment and coiled about a pin 94, projecting from ears 95 on the gear segments and complementary to the ears 83 on the cups.

The opposite ends of the springs extend laterally and outwardly toward the collars 76 and are bent laterally as at 92' to provide a latch portion 96 for engaging pins 97, extending from one of the ears 79 on the collars 76, so that when the collars are moved inwardly, as later described, the latch portion of the spring will engage over the pins 97 to prevent return movement of the collar, as shown in Figs. 20 and 22. In order to retain the latch position of the springs for certain engagement by the pin, I provide the free ends of the spring with hooks 99 extending around the pins 97 when the collars are in their outside normal position. Release pins 100 are provided on the respective outer ends of the plate 52 for engagement with the springs 92 when the cups are opened their maximum distance, so that the latch portions of the springs will be disengaged thereby to release the collars and allow the springs 78 to return them to normal position, as later described.

The disk 35 carrying the pairs of egg receiving cups comprises a revolving dial which carries the eggs through various steps in the process of breaking the shells and separating the contents, and each operation on the egg takes place during intermittent movements of the dial accomplished through a transmission mechanism now described.

Keyed to the inner end of the shaft 39, which projects into the gear housing 1, by spline 101, is a spur gear wheel 102 and meshing with the gear 102 is a pinion 103 rotatably mounted on a shaft 104, fixed in a boss 105 projecting inwardly of the transmission case on the side wall 3, Fig. 9.

In order to actuate the pinion 103 intermittently for providing intermittent rotation of the cup carrying dial member, I prefer to employ a Geneva stop gearing, including a Geneva gear 106 rotatably mounted on the shaft 104 in driving relation with the pinion 103, and provided with radial slots 107 spaced 90° apart and opening to the periphery thereof (Fig. 15). The periphery of the member 106 between the slots 107 is provided with inwardly curved faces 108 corresponding to the curvature of a Geneva block 109 with which the Geneva gear engages to prevent rotation of the Geneva gear during the idle moments of the cup carrying member.

The block 109 is rotatably mounted on a shaft 110 extending transversely of the transmission case and provided with reduced end portions 111 which are mounted in bearing openings 112 formed in the side plate 3 and in the cover plate 8.

The Geneva block is also best illustrated in Fig. 15 and has a radial cutout portion 113 to receive the projecting arm portions 114 on the Geneva gear to permit rotation of the Geneva gear when acted upon, as later described. The Geneva block is further provided with laterally extending concentric hub portions 115 and 116, for spacing the Geneva block transversely of the case in proper relation with the Geneva gear. The Geneva block is rotated by a gear 117 having a shaft diameter substantially the same as the diameter of the hub portion 115, and the gear is pressed thereon to provide driving relation between the gear and the Geneva block.

The gear 117 carries a roller 118 rotatably mounted on a pin 119 carried laterally of one of the spokes 120 of the gear so that when the gear is rotated the roller carried thereby will engage one of the slots 107 in the Geneva gear to rotate it one-quarter turn, which, due to the ratio between the gear 103 and the gear 102, rotates the egg carrying cups one-sixth of a revolution, the Geneva gear 106 being so positioned with relation to the Geneva block 109 that the roller 118 aligns with the cutout portion in the Geneva block so that when the roller starts to engage in one of the slots of the Geneva gear the cutout portion is in proper position to receive the arms 114 on the Geneva gear, and the Geneva gear is permitted to turn until the roller 118 has moved out of the slot, at which point the periphery of the Geneva block has again come in contact with a curved face 108 of the Geneva gear to prevent rotation of the Geneva gear until the roller 118 has made another revolution to engage the succeeding slot in the Geneva gear member.

The gear 117 is driven by drive pinion 121 mounted on a shaft 122, one end of which is rotatably fixed in the boss 123 projecting from the inner face of the side wall 3. The opposite end of the shaft 122 projects through an enlarged opening 124 in the cover plate and carries a pulley and clutch mechanism now described.

Rotatably mounted on an extension 125 of a sleeve 126, which is fixed on the extending end of the shaft 110, exteriorly of the case, is a pulley 127 which may be driven by a belt 128 from a line-shaft or other suitable power source (not shown). The pulley 127 is spaced from the housing cover by an enlarged portion 129 of the sleeve 126, having a collar flange 130 bearing against the cover plate, the pulley being retained against the enlarged portion of the sleeve by a retaining collar 131 fixed to the outer end of the shaft 122 by a pin 132 extending through the collar, the sleeve and the shaft 122. Thus it is apparent that the pulley is freely rotatable on the sleeve extension and is adapted for driving the shaft through a clutch mechanism now described.

Extending from the inner side face of the pulley 127 is a laterally projecting concentric flange 133 and seated against the face of the pulley, and against the inner periphery of the flange, is a friction ring 134 having a tapered inner face 135 for engagement by a cone clutch element 136. The clutch element 136 comprises spaced disks 137 and 138 integrally connected by a hub portion 139 slidably keyed to the sleeve 126 by a spline 140.

The outer peripheries of the disks 137 and 138 are provided with laterally directed flanges 141 and 142, having beveled peripheries 143, respectively. The beveled flange 141 on the disk 137 is adapted for engagement with the beveled face 135 of the friction ring on the pulley and the beveled flange 142 on the disk 139 is adapted for engagement with a complementary friction ring 144 fixed to the transmission housing. The friction ring 144 is supported by the transmission cover and is retained thereto by a cylindrical flange 145 projecting outwardly from the cover plate and in abutting alignment with the flange 133 on the pulley.

The flange 145 also serves as a housing for the clutch elements and is provided with a slotted opening 146 through which the clutch actuating lever 147 projects. The clutch lever 147 is mounted on a lug 148 extending from the cover plate adjacent the slotted opening, as best shown in Fig. 4, and the lever is pivotally mounted on a pin 149 carried by the lug 148. This lever is provided on its inner end with a yoke 150 for engaging a split ring 151 loosely mounted on the hub 139 of the clutch member, the connection between the split ring and the lever yoke being accomplished by pin connections 153 and 154, as in ordinary practice.

The opposite end of the lever projects forwardly of the machine and terminates at a point in convenient access to the operator. Thus, it is apparent that when the clutch member is moved into engagement with the pulley, the pulley will drive the clutch member and the sleeve 126 to drive the shaft 122 and pinion 121, and when the clutch is shifted to the opposite direction to engage the fixed friction ring 144, rotation of the pinion is stopped due to the braking action between the disk element 138 and the friction ring.

The clutch member 136 is preferably retained in engagement with the clutch pulley by a spring 156 coiled about the sleeve 126 and having one end bearing against the collar 130 and its other end engaging in a recess 157 formed in the face of the clutch member.

In order to retain the clutch member in braking relation with the friction ring 144 when the machine is idle, I secure a spring latch 158 to the cover plate having a shoulder 159 for engaging the side edge 160 of the lever 147.

Whenever the lever is to be moved to shift the clutch member from braking position, the lever is lifted slightly to disengage it from the shoulder 159.

Rotatably mounted in a sleeve 161 attached to the upper left hand corner of the transmission housing (Fig. 5) by screws 162 which extend through openings in a flange 163 on the sleeve and into the side wall of the transmission case, is a rock shaft 166 and fixed on the outer projecting end of the rock shaft is an egg loading member 167 which is actuated in timed relation with the movements of the cup dial for receiving the eggs from a delivery chute 168 for discharging them into a pair of cups, as later described.

Fixed on the inner end of the rock shaft 166 is a pinion 169 and engaging the teeth 170 of the pinion is a rack bar 171 slidable along the inner wall of the transmission case in spaced guides 172 and 173 attached to the wall 3 of the case, so that when the rack bar is reciprocated, the egg loader 167 is oscillated, as now described.

In order to reciprocate the rack bar I mount a cam disk 174 on the hub 116 of the Geneva block, so that the disk is rotated therewith to actuate the rack bar during movement of the block. The cam disk 174 is provided on its inner face adjacent the wall 3 of the casing with a cam groove 175 having a low lobe portion 176 and a high lobe portion 177 for receiving a roller 178 mounted on the end of the rack bar whereby engagement of the roller in the low lobe portion of the cam groove causes downward movement of the bar to rock the egg loader in a clockwise direction (Fig. 5), and when the roller 178 enters the high lobe portion of the groove the egg carrier is oscillated in an anti-clockwise direction.

The egg loader 167 preferably comprises a pair of rod-like elements 179 and 180 spaced apart and welded to the rock shaft as at 181. The members 179 and 180 each comprises forwardly extending straight portions 182 and rearwardly extending upwardly curved portions 183 to provide an egg receiving seat 184 between the members when the egg loader is in the position shown in Fig. 16, ready to remove an egg from a delivery chute 168.

Extending downwardly from the terminals of the curved portions 183 are arcuate portions 185 curved on a radius generated from the axis of the rock shaft so that when the rock shaft is oscillated to the position shown in Fig. 17, for discharging the egg into a pair of egg receiving cups, the vertex 186 formed between the curved extensions 183 and the arcuate portions 185 engage between the egg received and the next egg in the chute to separate the eggs and stop movement of the eggs in the chute as the egg loader is rocked in a clockwise direction shown in Fig. 17.

The arcuate portions of the egg loader preferably pass through slots 187 formed in the lower end of the chute. The machine is so timed that when the egg loader is moved to discharge an egg, the egg carrying dial has come to rest with a pair of cups open to receive the egg, as shown in Figs. 4, 5 and 18.

Each of the egg cups 50 and 51 is provided with concave egg supporting disks 190 which receive the egg and cushion its fall as it rolls down the straight portions of the egg carrier into the cups. The disks 190 are soldered to the central convolution 191 of a conical spiral 192, and the outer convolution 193 of the spiral is mounted in a peripheral groove 194 formed in the inner surface of the cup. Thus the concave disks 190 are yieldingly supported in the cups by the spiral springs, and when the cups close on the eggs, the disks 190 engage the ends of the egg and yieldingly support it in suspension and in spaced relation with the walls of the cups. It is apparent that with this construction the springs and disks may be readily removed from the cups for cleansing purposes by simply removing the outer convolution of the spring from its retaining groove which permits the removal of the spring and its disk.

Suspended from the side wall of the transmission housing below the egg carrying dial is a trough-shaped pan 195 (Fig. 5) for receiving drippage from the cups and portions of egg whites which still remain in the shells. The pan 195 is provided with a pair of upstanding ears 196 provided with inverted keyhole openings 197 for engaging headed screws 198 which are threaded into the side wall of the transmission case, whereby the pan may be readily disengaged from its mounting by raising the pan vertically so that the restricted portion 199 of the openings 197 will be moved from engagement with the heads of the screws 198 to permit passage of the heads through the enlarged portions 200 of the openings 197, whereupon the pan may be removed from the machine and emptied or sterilized.

Mounted above the pan and slightly to the left of a vertical center line through the egg carrying dial is a pair of nozzles 201 and 202 directed forwardly and laterally toward the cups as they pass their lowermost position so that air discharged from the nozzles will be directed in the upper inner portion of the egg shells to dislodge and remove portions of the whites still sticking to the shells, as illustrated in Fig. 22, and later described.

Figure 6:
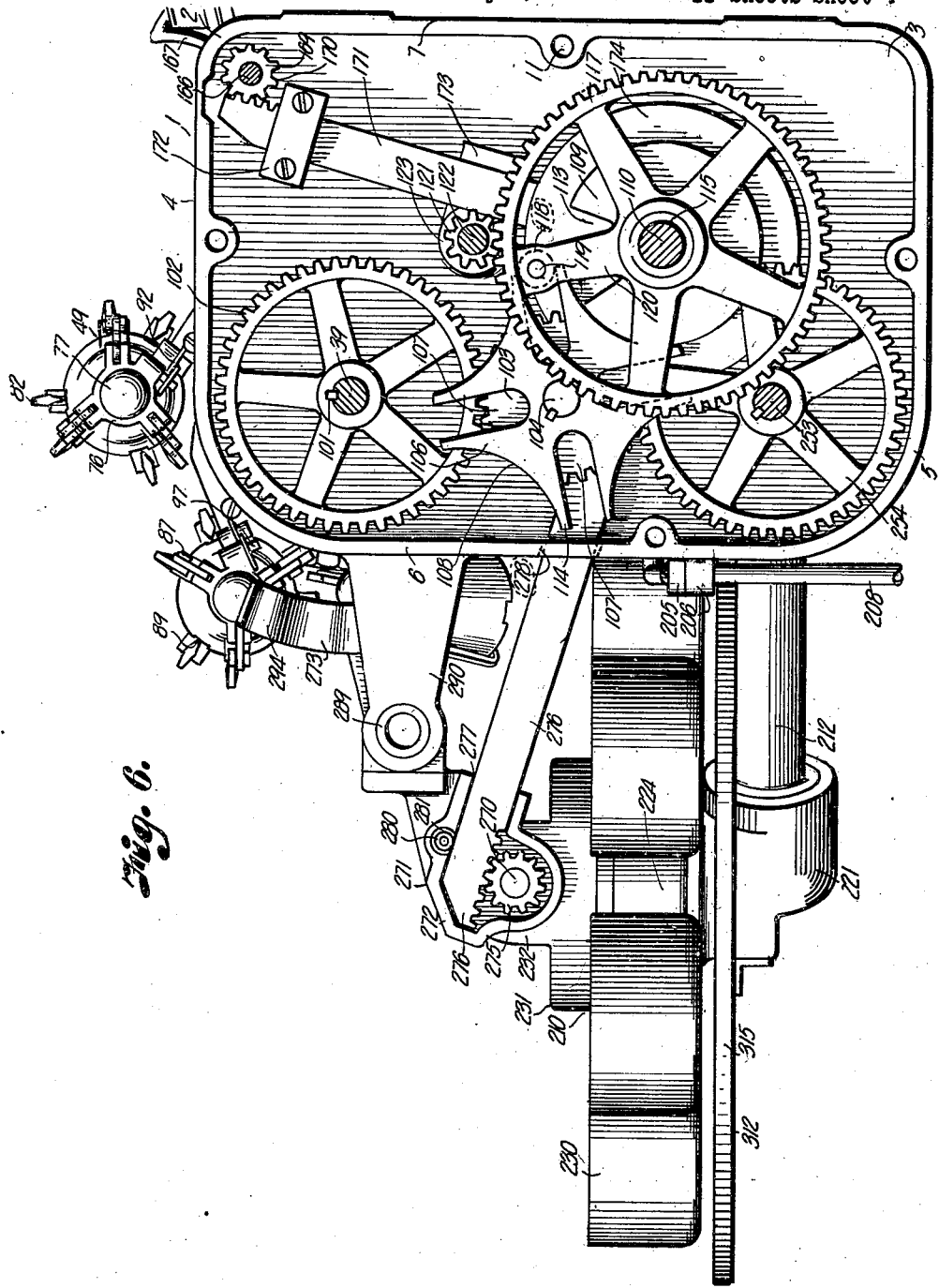
Fig. 6 is a view of the opposite side of the machine with the gear case cover removed to illustrate the mechanism driving various operative elements taken on the line 6—6, Fig. 4.

The nozzles 201 and 202 are preferably integral with a common fitting 203 which is threaded on the end of an air supply pipe 204 supported from an end wall of the transmission housing by connector members 205 and 206, the connector member 206 being attached to the transmission case by screws 207 which extend through the connector member and into the case, as best shown in Fig. 7. The connector member 206 is provided with an air supply pipe 208 which communicates with the supply pipe 204 through the connector 205, which is removably attached to the connector 206 by screws 209 extending through the connector 205 and into the connector 207, as shown in Figs. 6 and 7.

Supported in horizontal alignment with the plane through which the egg carrying cups travel, is an egg inspection turret generally designated 210, and which includes a lower cup-shaped housing 211 supported in position from the transmission case by a tubular shaft housing 212, one end of which is secured in an elbow-shaped casting 213 having a peripheral flange 214 for attaching the casting to the side wall 3 of the housing by screws 215 that extend through openings 216 in the flange and into threaded openings 217 in the case. See Fig. 10.

The member 212 is provided with an enlarged flange portion 218 of sufficient diameter to be snugly received in the inner bore 219 of the member 213 and its opposite end is provided with a similar flange 220 which is snugly received in an L-shaped extension 221 cast integral with the cup 211.

Rotatably mounted on a peripheral flange 222 formed on the vertical wall 223 of the member 211 is a cup-shaped turret member 224 comprising a bottom portion 225 resting on the flange 222 and provided with a depending flange 226 received in the inner diameter of the cup-shaped member 211 so that the turret member is retained in functional position on the member 211.

The turret member 224 also includes a peripheral wall 227 and located in spaced relation about the periphery of the wall are integral bosses 228 extending outwardly thereof and provided with central bores 229 for rotatably mounting egg inspection cups 230, later described.

Closing the upper portion of the turret member is a cap-shaped cover 231 having a depending flange portion resting on the upper periphery of the member 224, and provided on its top is an integrally formed gear housing 232 provided with a vertical bore 233 which aligns with a similar bore 234 formed in the bottom of the member 211 and in a depending boss 235.

Fixed in the bores 233 and 234 is a vertical shaft 236 anchored in the bores by pins 237 and 238 extending through the respective boss 235 and gear housing 232, as shown in Fig. 7.

Formed centrally on the shaft 236 in the plane of the bores 229 is a horizontally positioned disk-like member 239 of sufficient diameter to be received within the turret member 224, and extending above and below the disk concentrically with the shaft are enlarged portions 240 and 241 respectively, the enlargement 241 forming a stop-shoulder 242 for engaging the bottom of the turret member to retain it in position on the housing member 211, the upper enlarged portion 240 providing a stop-shoulder 243 for supporting a pair of gears 244 and 245, later described.

Fixed to the bottom of the turret member 224 by pins 246 is a bevel gear 247 having a bore 248 for receiving the shaft 236 so that the gear may rotate thereon and drive the turret, when actuated, by a bevel pinion 249 mounted in the L-shaped extension 221 of the member 211.

The pinion 249 is pinned to a shaft 250 extending longitudinally through the housing member 212 and into the casting 213, and carries pinned thereto a pinion 251 complementary to the pinion 249. The pinion 251 is driven by a bevel pinion 252 meshing therewith and fixed to a stub shaft 253 rotatably mounted in a boss extending inwardly of the case from the side wall 3, and fixed to the end of the shaft opposite the pinion 252 is a spur gear 254 complementary to the spur gear 102 which drives the egg carrying dial above described.

The gear 254 meshes with the drive pinion 103 diametrically opposite the gear 102, thus the turret member 224 is rotated from the gearing in the transmission case through the pinions 251 and 252 driving the shaft 250 and the gear 247 through the gear 249 so that whenever the Geneva gear is rotated to move the egg carrying dial the turret 224 is rotated simultaneously therewith to move an egg inspection cup into position for receiving an egg discharged from a pair of cups, as later described in the operation of the machine.

I may provide a various number of inspection cups or receptacles 230 although with the machine illustrated, having six pair of egg breaking cups, I also employ six inspection cups, each of which is removably supported in the boss 228 heretofore described by a stub shaft 255 projecting from the vertical wall of the cup and rotatably mounted in the boss so that the shafts extend into the turret 224 and are provided at their terminals with flattened tongue portions 256 which ride in a peripheral groove 257 formed in the disk 239 for holding the cups in vertical alignment and preventing their turning in the bosses until the cups come into alignment with a receiving hopper 258, which is preferably located below the turret at a station point just ahead of the point where the egg is discharged from the egg breaking dial, so that the operator may have a maximum amount of time to observe the condition of the eggs as they are carried around by the turret.

Located in a recess 259 formed in the disk 239 in substantial alignment with the hopper 258 is a bevel pinion 260 fixed on a shaft 261 secured in a bore 262 formed in an enlarged portion 263 on the disk adjacent the recess 259, the shaft being retained in the bore by a set screw 264 threaded into the disk and provided with a reduced extension 265 extending into a peripheral groove 266 formed in the shaft.

Formed on the rear side of the pinion 260 is a rib 267 (Figs. 27 and 28) bridging the gap of the recess 259, and, formed in the rib is a groove 268 for providing a continuation of the groove 257 in the disk. The groove 268 also extends through the shaft 261 so that when a cup stops in alignment with the shaft 261 the tongue 256 on the cup shaft 255 is received therein, and when the gear 260 is rotated, the cup will rotate therewith to empty the contents into the hopper 258, as now described.

The pinion 260 meshes with the gear 244 before mentioned and which is riveted to the opposite facing bevel gear 245. The gear 245 meshes with a bevel gear 269 fixed on a horizontal shaft 270 rotatably mounted in a tubular housing 271 carried by the cover member 231 and in a housing 272 secured to an arm 273 projecting from the end wall of the transmission case. One end of the tubular member 271 is provided with a collar portion 274 received in the extension of the cover, and the opposite end is received in an opening formed in the housing 272 carried on the arm 273.

Fixed on the shaft 270 opposite the gear 269 is a spur gear 275 which is intermittently oscillated by a rack bar 276 extending through an opening 277 in the housing 272 and through an opening 278 in the transmission case so that the free end of the rack bar extends into alignment with the cam groove 175 on the cam disk 174 and carries a roller 279 received in the cam groove.

The opposite end of the rack bar 276 is retained in meshing contact with the gear 275 by a roller 280 rotatably mounted in a recess 281 formed in the housing 272, as best shown in Fig. 6. Thus, it is apparent that when the low lobe of the cam groove contacts with the roller on the rack bar, the rack bar will be moved to rock the gear 275 in a clockwise direction (Fig. 6) to rock the shaft 270 to cause the gear 269 to rotate the gears 244 and 245, and thereby rock the pinion 260, tipping the inspection cup and emptying the egg. When the roller on the rack bar moves into the high lobe portion 177 of the cam groove 175 the rack bar will be moved in the opposite direction to return the cup to horizontal position.

In order to retain the inspection cups from accidental removal from the turret, I provide spring clips 282 comprising U-shaped members having depending legs 283, each provided with facing curved seat portions 284 for engaging in a groove 285 formed in the shaft trunnion which mounts the cups.

The spring clips are inserted astride the shaft trunnions through arcuate grooves 286 formed in the turret bosses 228 and communicating with the grooves in the trunnion shafts. Thus the cup trunnions are yieldingly retained by the spring clips against accidental misplacement, but the cups may be readily removed from the turret by grasping the cups and pulling them outwardly against the spring tension of the clips which causes the legs of the clips to move outwardly of the grooves 285 and release the cup trunnion shafts 255.

It is also apparent that the cups may be readily applied by inserting the trunnions in the turret openings until the spring clips engage in the retaining grooves 285.

Extending from a boss 287 carried by the arm 273 is a pipe member 289 which extends horizontally of the machine, forwardly of the egg carrying dial, and mounted on the outer end of the pipe is an arm 290 directed rearwardly of the machine, as best shown in Fig. 5, and fixed to the free end of the arm is an arcuate-shaped cam plate 291 having a curved portion 292 extending into alignment with the sleeves 75, actuating the fingers 82 for piercing the egg shell, the cam element being secured to the arm by screws 293 which extend through the arm and are threaded into the cam element.

Mounted on the arm 273 at the opposite side of the machine and in alignment with the cam plate 291 is a similar cam plate 294 which cooperates with the cam element 291 for closing the fingers carried by the egg breaking cups on that side of the machine.

While the machine thus far described may be supported and operated independently of a conveyor mechanism for carrying eggs to the machine, I prefer to associate and mount the machine on the framework of a conveyor designated 295 in the drawings. The conveyor illustrated includes a trough-shaped table 296 supported by longitudinal angle irons 297 and legs 298, as shown in Figs. 1, 2 and 3.

I prefer to mount the transmission case directly on the angle irons 297 by bolts 299 which extend through openings 300 in the vertical legs 301 of the angles, and through openings 302 formed in the transmission case which are spaced from the framework of the conveyor by spacers 303 inserted between the vertical legs 301 of the angle iron and bosses 304 cast on the transmission case, as best shown in Figs. 3 and 8.

Extending along the table is a conveyor belt 305 for conveying eggs along the table to be discharged through openings 306 formed in the sides of the table and communicating with the egg delivery troughs 168 which carry the eggs by gravity to the egg carrier. Fixed to an arm 307 attached to one of the longitudinal angles 297 is an arm 308 which projects at an angle toward the direction of travel of the belt so that eggs carried thereby will be diverted from the belt by the arm through the opening 306 into the egg delivery chute.

The arm lies flat upon the belt and is only of sufficient thickness to provide a guide for diverting the eggs, but as soon as the delivery chute is filled the eggs will pass on over the arm to the next machine but as the eggs are delivered from the chute the arm will divert additional eggs to maintain the chute filled to capacity.

Extending longitudinally of the conveyor belt and below the table is a spiral screw conveyor 309 for receiving the egg shells which are discharged from the cups into a chute 310 communicating with the trough 311 in which the screw 309 is rotatably mounted so that shells discharged from the machine will gravitate down the chute 310 and be removed by the screw conveyor 309.

In order to prevent loss of egg contents which may drip from the cups, I provide a substantially U shaped pan 312 which is supported under the turret by an angle iron 313 attached to a lug 314 extending from the housing member 211, the pan being provided with a peripheral flange 315 and so positioned that the open side 316 of the pan is positioned over the hopper 258 to allow the emptied eggs to drop into the hopper.

The operation of a machine constructed and assembled as described is as follows:

Assuming that the belt conveyor is carrying eggs to the machines, eggs will be diverted by the arms 308 through the opening 306, filling the delivery chute 168. As soon as the chute is filled the eggs will pass on over the arm 308 and continue to do so until one of the eggs has been fed from the delivery chute into the machine, whereupon another egg will be diverted into the conveyor chute to take the place of the egg that was discharged.

The operator seated in front of the inspection turret, as shown in Fig. 1, will then grasp the clutch actuating lever 147 and shift it to the left, thereby moving the clutch into engagement with the drive pulley for rotating the drive shaft 112 and main drive gear 117 through the pinion 121.

The drive gear will then rotate the Geneva block 109 and cam disk 174, and when the roller 178 on the rack bar 171 is engaged by the high lobe portion of the cam groove, the rack bar will be moved upwardly to rotate the pinion 169 and rock the rock shaft 166 to move the egg loader 179 into position, shown in Fig. 16.

The foremost egg in the delivery chute will then roll by gravity into the egg receiving seat of the egg loader, as shown, the straight extensions 182 on the egg loader preventing the egg from rolling off the conveyor into the machine. The roller 178 will then have moved into the low portion of the cam, drawing the rack bar 171 downwardly, rotating the gear 169 in the opposite direction to move the rock shaft and egg loader in a clockwise direction, as shown in Fig. 17. In this position the arcuate arms on the egg loader are extended upwardly through the slots 187 in the delivery chute, and retain the eggs therein.

The egg removed by the egg loader will then roll down the extensions 182 and into a pair of opened egg cups 50 and 51 and be received between the disks 190 which are mounted in the cups on the spiral springs 192, as best shown in Fig. 18. The machine is so timed that at this point the roller 118 on the drive gear 117 is just entering a slot 107 of the Geneva gear, and the notch 113 positioned to receive the arms 114 of the Geneva gear.

Continued rotation of the drive gear will cause the roller 118 to rotate the Geneva gear and will move the gear until the roller has passed out of the slot 107. At this point the curved periphery of the Geneva block has contacted with one of the curved portions 108 of the Geneva gear, which retains the Geneva gear from further rotation. The Geneva gear has, during its partial rotation, rotated the gear 102 through the pinion 103 and caused rotation of the egg carrying dial substantially one-sixth of a rotation in a clockwise direction (Fig. 5). During this movement of the dial the roller 71, tracking in the cam groove 73 in the cam drum has moved into a portion 317 of the cam groove adjacent the inner end of the cam drum, moving the gear segment 60 on its pivot and carrying the cup 50 into parallel alignment with the axis of the turret. At the same time the gear segment 61 moves the gear segment 60 on its pivot to bring the cup 51 into aligning engagement with the cup 50. Thus the cups close on the egg and the egg is supported at its ends between the concave disks 190. This position of the cups is best shown in Figs. 19 and 25.

During movement of the pair of egg cups just described, a succeeding pair of egg cups has moved to open position for receiving another egg from the delivery chute, and the egg loader is now moving to deposit another egg in that pair of cups.

The roller 188 at this time has made a complete revolution and is again in position to act on the Geneva gear, as previously described, and advance the egg carying dial another step in its forward rotation, carrying the egg receiving cups another one-sixth turn to position the pair of cups ready for engagement with the cam plates 191 and 194 upon another movement of the dial.

The roller on the gear 117 then has made another revolution to move the Geneva gear another step which again advances the dial. During this last movement of the dial the semispherical ends 77 of the sleeves 75 contact with the inwardly curved portions 192 of the cam plates, moving the sleeves inwardly on the stub shafts 74 which are extending from the egg cups, as previously described, and against tension of the springs 78. This movement of the sleeves causes the links 80 to swing the rear ends of the knife carrying fingers 82 outwardly, moving the fingers on their pivots 84 which projects the knife portions of the fingers through the notches 91 of the cups to pierce the egg shell, as best shown in Fig. 20, whereupon the latch portions 96 of the springs 92 have moved into latching engagement with the pins 97 carried on the collar 76 so that the latch springs 92 retain the fingers in engagement with the egg.

The Geneva gear is then moved to advance the dial another step, during which movement the roller 71 has moved into an angle portion 318 of the cam groove to cause the gear segment 60 to move in an anti-clockwise direction, which also moves the gear segment 61 in a reverse direction, thereby carrying the cups into open position, as shown in Figs. 5 and 21, and, due to the fact that the fingers are still projecting through the egg shell, opening of the cups separates the egg shell with one-half of the shell retained in each cup by the fingers 82. In this position of the cups they have travelled approximately one hundred and eighty degrees through their cycle and are now directed downwardly, as shown, and are discharging the contents of the egg into an egg inspection cup 230.

Attention is called to the fact that the center of the egg inspection cup is positioned slightly forward of the vertical center between the open cups which, due to the centrifugal discharge of the egg contents, causes the contents to drop in the center of the inspection cup.

The Geneva gear is then again acted upon to advance the dial another step, which advances the pair of egg cups, in open position with the fingers retaining the shells in the cups against tension of the spiral springs 192. The cups then come to rest in front of the air nozzles 201 and 202 which direct blasts of air into the upper portion of the shells, dislodging and removing any of the whites that may be adhering thereto into the pan 195, thereby reclaiming the entire contents of the egg.

Attention is here called to the fact that with ordinary hand breaking of the eggs, and in other known types of egg breaking machines, this part of the egg contents is discharged with the shell and no attempt, to my knowledge, has been made to save that portion of the egg whites which does not readily drain from the shells.

The dial is then advanced another step, and during this advancement of the cups the roller 71 is again moved by the cam groove to cause further opening of the cups. This additional movement of the cups causes the latch springs which are retaining the knife fingers in closed position to contact the pins 100, and disengage the latch portions 96 of the springs from engagement with the pins 97, whereupon the collars 76 are then returned to their normal position by the springs 78, thereby releasing the fingers 82 from engagement with the egg shells. Upon release of the egg shells the disks 190 tensioned by the spiral springs 192 discharge the shells into the chute 310 and the shells slide by gravity into the conveyor trough 311 and are removed by the spiral screw 309.

During the next step in the rotation of the dial the cups are slightly closed again to normal open position for receiving another egg from the delivery chute 168, thereby completing one cycle of the egg carrying dial.

During each movement of the egg carrying dial the egg inspection turret has also been advanced simultaneously with the movement of the egg carrying dial because each actuation of the Geneva gear also causes rotation of the gear 254 which drives the shaft 250 through the gears 252 and 251, driving the gear 249 to rotate the gear 247 secured to the bottom of the turret 224, thereby advancing the egg inspection cups before the view of the operator, permitting the operator to inspect the eggs and remove cups containing defective eggs, so that a clean sterilized cup may be inserted in place of the polluted cup.

As the inspection cups come into alignment with the egg receiving hopper 258, the cam disk 176 causes the rack bar 276 to rock the pinion 275 in a clockwise direction and rotate the gears 269, 245 and 244 to oscillate the gear 260 on the shaft 261 which rocks the cup trunnion shaft 255 and empties the contents of the cup into the hopper, as shown in Fig. 7.

The cam disk will then move the rack bar in the opposite direction to cause reverse movement of the gear 260 which returns the inspection cup to upright horizontal position.

Attention is called to the fact that the emptying movement of the cup 230 takes place during the idle moments of the turret 224, thereby assuring positive discharge of the egg contents into the hopper 258.

When the breaking cups have been soiled to an extent where they will pollute good eggs which may be broken therein, the entire egg breaking dial will be removed from the machine by removing the cap screw 27 so that the dial may be removed from the head 19, and placed in a sterilizer, and a clean sterilized dial member may be substituted for the one removed so that operation of the machine may be continued with but slight interruption. Thus it is apparent that all parts of the machine which may come in contact with the eggs and which may be polluted thereby may be readily removed for sterilization.

What I claim and desire to secure by Letters Patent is:

1. In a machine of the character described, a support, a rotatable member on the support, a pair of egg retaining members associated with the rotatable member, shell piercing fingers on the egg retaining members, means for closing the members on the egg, means for actuating the fingers operable upon rotation of the rotatable member, means for separating the retaining members operable upon rotation of the rotatable member to sever the shell to discharge the contents thereof, and means for removing the shells from the egg retaining members.

2. In a machine of the character described, a pair of pivotally supported egg retaining members, means for moving the retaining members through a fixed path, means for pivoting the retaining members to close on an egg, shell piercing fingers associated with the egg retaining members, means for actuating the fingers, means for actuating the retaining members on their pivots to sever the shell to discharge the contents thereof during movement of the retaining members and means for removing the shells.

3. In a machine of the character described, a pair of pivotally mounted egg retaining members, an egg loader associated with the members for inserting an egg in said members, means for pivoting the retaining members to close on the egg, shell piercing fingers pivotally mounted on the retaining members, means for actuating the fingers, means for swinging the retaining members on their pivots to divide the shell for emptying the contents thereof, and means in the retaining members for automatically discharging the shells.

4. In a machine of the character described, a pair of pivotally mounted egg retaining members, means for impaling an egg in the retaining members, a cam for swinging the retaining members on their pivots into closed position and into open position to divide the shell for discharging the contents thereof, and means operable incidental to the final opening movement of the retaining members for releasing the impaling means to allow discharge of the shells.

5. In a machine of the character described, a pair of egg retaining members, meshing gear segments on the respective retaining members, shell impaling means carried by the retaining members, means for latching the impaling means, an actuator for the gear segments to move the retaining members to closed position and to open position to divide the shell impaled by said impaling means and allow discharge of the egg contents from the divided shells, and means for releasing the impaling means to release the shells.

6. In a machine of the character described, a pair of egg retaining members, gear segments on the retaining members, egg impaling fingers pivotally mounted on the retaining members, sleeves slidable on the retaining members for actuating the impaling fingers to impale the egg in the retaining members, an actuator for the gear segments to move the retaining members to close on an egg and the retaining members to open for dividing the egg shell and discharging the contents thereof, and means for discharging the shells.

7. In a machine of the character described, a pair of egg retaining members, gear segments on the retaining members, egg impaling fingers pivotally mounted on the retaining members, sleeves slidable on the retaining members for actuating the impaling fingers to impale the egg in the retaining members, latches for retaining the fingers in impaling position, an actuator for the gear segments to move the retaining members to a closed position to retain an egg and to open position for dividing the egg shell to discharge the contents thereof, and means for releasing the fingers from engagement with the shells.

8. In a machine of the character described, a pair of egg retaining members, gear segments on the retaining members, egg impaling fingers pivotally mounted on the retaining members, sleeves slidable on the retaining members for actuating the impaling fingers to impale an egg in the retaining members, latches for retaining the fingers in impaling position, an actuator for the gear segments to move the retaining members to close on the egg and to an open position for dividing the egg shell to permit the contents to discharge therefrom, means for releasing the latches to free the shells, and springs carried in the retaining members for ejecting the shells.

9. In a machine of the character described, a pair of egg retaining members, gear segments on the retaining members, egg impaling fingers pivotally mounted on the retaining members, sleeves slidable on the retaining members for actuating the impaling fingers to impale the egg in the retaining members, an actuator for the gear segments to move the retaining members to close on the egg and to open position for dividing the egg shell to permit the contents to discharge therefrom, and spring pressed disks in the retaining members for ejecting the shells.

10. In a machine of the character described, a pair of facing egg retaining members, gear segments on the retaining members, egg impaling fingers pivotally mounted on the retaining members, shaft members extending from the retaining members, sleeves slidable on the shaft members, links connecting the sleeves and the impaling fingers, means for actuating the sleeves to move the fingers into egg impaling position, an actuator for the gear segments to move the retaining members to close on the egg and to an open position for dividing the shells to empty the contents thereof, and springs engaged with the sleeves to return the fingers to normal position to release the shells.

11. In a machine of the character described, a pair of egg retaining members, gear segments on the retaining members, egg impaling fingers pivotally mounted on the retaining members, shaft members extending from the retaining members, sleeves slidable on the shaft members, links connecting the sleeves and the impaling fingers, means for actuating the sleeves to move the fingers into egg impaling position, latches for the fingers, an actuator for the gear segments to move the retaining members to close on the egg and to an open position for dividing the shells to empty the contents thereof, and springs engaged with the sleeves to return the fingers to normal position, and means for releasing the latches upon further opening of the retaining members to allow discharge of the shells.

12. The method of breaking eggs and separating the contents from the shells comprising enclosing an egg in retaining members, moving the retaining members through a fixed path, separating the retaining members to divide the shell of the egg to allow discharge of the contents during movement of the retaining members, then forcibly discharging portions of the contents that may adhere to the shells, and then releasing the shells from the retaining members.

13. The method of breaking eggs and separating the contents from the shells comprising enclosing an egg in retaining members, opening the retaining members to divide the shell of the eggs to allow discharge of the contents, directing an air blast into the shells for discharging portions of the contents that adhere to the shells and then releasing the shells from the retaining members.

14. The method of breaking eggs and separating the contents from the shells comprising enclosing an egg in egg retaining members, impaling the egg in the retaining members, opening the retaining members to divide the shell of the eggs, directing an air blast into the shells to discharge portions of the contents that adhere to the shells, and then releasing the shells from the retaining members.

15. In a machine of the character described, a pair of pivotally mounted egg retaining members, means for yieldingly supporting an egg in the retaining members, means for impaling the egg in the retaining members, a cam for swinging the retaining members on their pivots to close the retaining members on the egg and to separate the retaining members and divide the shell for discharging the contents thereof, and means operable on separation of the retaining members for releasing the impaling means to allow discharge of the shells.

16. In a machine of the character described, a pair of egg retaining members and yieldably mounted cup-shaped disks in the retaining members adapted for engaging the ends of an egg to center the egg in the retaining members, shell piercing fingers projectible into the retaining members at a plurality of points about the circumference of the egg to retain the egg centered while being pierced thereby, means for actuating the fingers, and means for separating the retaining members to sever the egg shell through the pierced points.

17. In a machine of the character described, a pair of egg retaining members movable towards each other for enclosing an egg and having internal annular grooves, spirally coiled springs mounted in the grooves having their larger coils engaging in said grooves, and disks carried by the inner coils of the springs for centering the eggs in the retaining members.

18. A machine of the character described, including an egg breaking dial, means on the dial for supporting an egg, means for rotating the dial, means opening the shell of the egg during rotation of the dial to discharge the contents of the egg, an egg inspection turret operated in synchronism with the dial, and means carried by the inspection turret to receive the contents discharged from the shells.

19. A machine of the character described, comprising an egg breaking dial, means on the dial for supporting an egg, means for intermittently rotating the dial, means opening the shell of the egg during rotation of the dial to discharge the contents of the egg, an egg inspection turret operated in synchronism with the dial, and means carried by the inspection turret to receive the contents discharged from the shell.

20. A machine of the character described, comprising an egg retaining member, means moving the egg retaining member through a fixed path, means actuated during movement of the egg retaining member for severing the shell of the egg to allow discharge of the egg contents, a receptacle movable into position to receive the contents of the egg, and means for actuating the receptacle in synchronism with the movement of the egg retaining member.

21. A machine of the character described, including a dial, a support therefor, means on the dial for supporting an egg, means for rotating the dial, means actuated during rotation of the egg carrying dial for severing the egg shell to allow discharge of the contents of the egg, an egg inspection turret rotatably supported from the egg carrying dial support, means on the inspection turret for receiving the contents of the egg, and means for rotating the dial and turret in synchronism.

22. The combination of an egg carrying conveyor, an egg breaking dial associated with the conveyor, egg breaking means on the dial, a trough connecting the conveyor with the machine, means for diverting eggs from the conveyor into the trough, means for discharging eggs from the trough into the breaking means on the dial, and an egg inspection turret for receiving the egg contents from the breaking means.

23. In a machine of the character described, an egg breaking dial, egg retaining members on the dial, mechanism for rotating the dial, means for separating the retaining members to allow discharge of the egg contents, an egg inspection turret for receiving the egg contents, and means for rotating the inspection turret from the said mechanism.

24. In a machine of the character described, an egg breaking dial, egg retaining members on the dial, an egg carrying member for loading eggs into the egg retaining members, means for actuating the retaining members to close on an egg, a mechanism for rotating the dial, means for separating the retaining members to allow discharge of the egg contents, an egg inspection turret for receiving the egg contents, and means for rotating the inspection turret from the said mechanism.

25. In an egg breaking machine for separating the contents of an egg from the shell, an egg breaking mechanism, an actuator mechanism for the breaking mechanism, an egg inspection turret associated with the egg breaking mechanism, means for rotating the turret in synchronism with the egg breaking mechanism, egg receiving receptacles carried by the turret, and means actuated in timed relation with the egg breaking mechanism to rotate the receptacles for emptying the egg contents therefrom.

26. In an egg breaking machine for separating the contents of an egg from the shell, an egg breaking mechanism, an actuator mechanism for intermittently operating the egg breaking mechanism, an egg inspection turret associated with the egg breaking mechanism, means for rotating the turret in synchronism with the breaking mechanism, egg content receiving receptacles carried by the turret, and means for oscillating the receptacles to empty the contents thereof between operations of the egg breaking mechanism.

27. In a machine of the character described, a transmission housing, a bracket extending from the housing having a head thereon, a cam drum fixed to the head, a disk rotatably mounted on the drum, means for rotating the disk, a pair of egg retaining members mounted on the disk and adapted to move toward and away from each other, egg impaling fingers on the retaining members, means on one of the retaining members engaging the cam drum for actuating one retaining member with relation to the other retaining member during rotation of the disk to divide the egg shell and allow discharge of the contents thereof.

28. In a machine of the character described, a transmission housing, a bracket extending from the housing having a head thereon, a cam drum fixed to the head, a disk rotatably mounted on the drum, a drive shaft concentric of the drum, a shaft for the disk, clutch members connecting the shafts, a pair of egg retaining members mounted on the disk and adapted to move toward and away from each other, egg impaling fingers on the retaining members, means on one of the retaining members engaging the cam drum for actuating the retaining members during rotation of the disk to divide the egg shell and allow discharge of the contents thereof.

29. In a machine of the character described, comprising an egg breaking dial, egg retaining members on the dial, Geneva stop gearing for rotating the dial, an egg loader for feeding eggs into the retaining means, a cam on one of the Geneva members, a bar actuated by the cam for oscillating the egg loader, and means for breaking and separating contents of the eggs from the shells during rotation of the dial.

30. In a machine of the character described, comprising an egg breaking dial, egg retaining members on the dial, Geneva stop gearing for rotating the dial, an egg loader for feeding eggs into the retaining means, a cam on one of the Geneva members, a bar actuated by the cam for oscillating the egg loader, means for breaking and separating contents of the eggs from the shells during rotation of the dial, a receptacle for receiving the contents of the eggs, and means operated by the Geneva gearing for moving the receptacle into and out of receiving position.

31. In a machine of the character described, comprising an egg breaking dial, egg retaining members on the dial, Geneva stop gearing for rotating the dial, an egg loader for feeding eggs into the retaining means, a cam on one of the Geneva members, a bar actuated by the cam for oscillating the egg loader, means for breaking and separating contents of the eggs from the shells during rotation of the dial, a receptacle for receiving the contents of the eggs, and means operated by the Geneva gearing for moving the receptacle into and out of receiving position, and a bar actuated by said cam for moving the receptacle to empty the contents.

32. In a machine of the character described, an egg breaking dial, egg retaining members on the dial adapted to close on an egg, a transmission mechanism for rotating the dial, means for separating the retaining members to allow discharge of the egg contents, an egg inspection turret, means for rotating the inspection turret from the said transmission mechanism, a pivoted receptacle on the turret for receiving the egg contents from the dial, means for retaining the receptacles in functional position during part of the rotation of the turret, and means actuated by the cam for tipping the receptacles to empty the contents thereof.

33. In a machine of the character described, a pair of egg retaining members normally positioned in spaced relation, means for positioning an egg between the retaining members, a plurality of shell piercing fingers in co-operative relation with the retaining members, means for closing the retaining members over the egg, means for actuating the fingers to pierce the shell, means for retaining the fingers in shell piercing position, means for separating the retaining members to allow discharge of the egg contents, and means actuated by the opening movement of the retaining members to release the fingers.

34. In a machine of the character described, a pair of normally spaced egg retaining members, means for positioning an egg between the retaining members, a plurality of shell piercing fingers in co-operative relation with the retaining members, means for moving the retaining members through an arcuate path to close on the egg, a cam for actuating the shell piercing fingers to pierce the shell, means for retaining the fingers in shell piercing position, means for returning the retaining members through an arcuate path to cause division of the shell allowing discharge of the contents of the egg, and means for releasing the shell piercing fingers actuated by the last named movement of the retaining members.

35. In a machine of the character described, a pair of egg retaining members movable from and toward each other for receiving and closing on an egg, fingers on the retaining members for piercing the shell and retaining the divided shells in the retaining members when the retaining members are moved from each other, latch members for holding the fingers in shell piercing position means yieldingly supporting the shells against the fingers and to discharge the shells when the fingers are released from the shells, and means for releasing the latch members to release the fingers.

36. In a machine of the character described, a pair of egg retaining members movable from and toward each other for receiving and closing on an egg, fingers on the retaining members for piercing the shell and retaining the divided shells in the retaining members when the retaining members are moved from each other to sever the shell, means yieldingly supporting the shells against the fingers and to discharge the shells when the fingers are released from the shells, and means for releasing the fingers incidental to separating movement of the retaining members.

37. In a machine of the character described, a disk, means for rotating the disk, plates attached to the disk, a pair of facing retaining members pivotally mounted on each of the plates, shell piercing members carried on the retaining members, means for actuating the retaining members on their pivots to move the retaining members from and toward each other to receive and close on an egg, means for actuating the shell piercing members to pierce the shell to cause the shell to divide when the retaining members are pivoted away from each other, means latching the fingers in shell engaging position to retain the shells in the retaining members and allow drainage of the contents therefrom, and means for releasing the latching means to free the shells.

38. In a machine of the character described, a disk, means for intermittently rotating the disk, plates attached to the disk, a pair of facing retaining members pivotally mounted on each of the plates, shell piercing members carried on the retaining members, means for actuating the retaining members on their pivots to move the retaining members from and toward each other to receive and close on an egg, means for actuating the shell piercing members to pierce the shell to cause the shell to divide when the retaining members are pivoted away from each other, means latching the fingers in shell engaging position to retain the shells in the retaining members and allow drainage of the contents therefrom, and pins on the plates for engaging the latching means to free the shells.

39. A machine of the character described including an egg breaking dial, means on the dial for supporting an egg, means for rotating the dial, means opening the shell of the egg on rotation of the dial to discharge the contents of the egg, a cup for receiving the contents discharged from the shells, and means for moving the cup into and out of receiving position operable in synchronism with the dial.

40. A machine of the character described including a pair of normally open egg retaining members, means for moving the retaining members through a fixed path, means for closing the members on an egg operable incidental to initial movement of the members, shell piercing fingers associated with the retaining members, means for actuating the fingers to pierce the shell, means for opening the retaining members during final movement of the retaining members to allow discharge of the contents of the egg, and means for ejecting the shells.

41. A machine of the character described including a pair of pivotally mounted egg retaining members, means for moving the retaining members through a fixed path, means for pivoting the retaining members to close on an egg during the initial movement of the retaining members, shell piercing fingers associated with the retaining members, means for actuating the fingers to pierce the shell, means for pivoting the retaining members to open position during final movement of the retaining members to allow discharge of the egg contents, and means for discharging the shells.

42. In a machine of the character described, a pair of egg retaining members, shell piercing fingers on the egg retaining members, means for simultaneously actuating the members to close over an egg, means for actuating the fingers to pierce the shell of the egg, means for separating the retaining members to sever the shell to allow discharge of the contents thereof, an air discharge nozzle for directing an air jet into the opened shells to remove portions of the egg contents adhering to the shells, and means for ejecting the shells.

43. In a machine of the character described, an egg breaking dial, a pair of egg retaining members pivoted on the dial, means for rotating the dial, egg piercing fingers on the retaining members for impaling an egg, and means operable upon movement of the dial for moving the retaining members to a downwardly inclined open position to sever the shell and allow the egg contents to drain from the shells.

44. In a machine of the character described, a pair of egg retaining members, means for moving the retaining members through a fixed path, means for closing the retaining members on an egg, shell piercing fingers associated with the retaining members, means for actuating the fingers to pierce the shell of the egg, and means for separating the retaining members to sever the shell to discharge the contents of the egg during the movement of the retaining members.

45. In a machine of the character described, an egg retaining member, means for moving the egg retaining member through a fixed path, means actuated during movement of the egg retaining member for severing the shell of the egg to allow discharge of the egg contents, a receptacle movable into position to receive the contents of the egg, and means for moving the receptacle in timed relation with the movement of the egg retaining member.

46. In an egg breaking machine, a support, an egg loader on the support, a pair of cup-shaped retaining members movable with relation to the support, means for pivoting the egg retaining members away from each other into an upwardly open position to admit an egg from the egg loader, means for closing the retaining members on the egg, shell piercing means on the retaining members, and means for swinging the retaining members in a downwardly inclined open position to sever the shell and allow discharge of the contents of the egg.

47. In an egg breaking machine, a support, an egg loader on the support, a pair of cup-shaped egg retaining members movable with relation to the support, means for pivoting the egg retaining members away from each other into an upwardly open position to admit an egg from the egg loader, means for closing the retaining members on the egg, shell piercing means on the retaining members, means for swinging the retaining members into downwardly open position to sever the shell and discharge the contents of the egg, and a receptacle movable into position to receive the contents of the egg.

48. In an egg breaking machine, a pair of cup-shaped egg retaining members for enclosing an egg, shell piercing fingers pivotally mounted on the egg retaining members, shaft members projecting from said retaining members, sleeves slidable on the shaft members, links operably connecting the sleeves with said fingers, and means for sliding the sleeves on the shafts to actuate the fingers for piercing the shell of the egg.

49. In an egg breaking machine, a pair of cup-shaped egg retaining members for enclosing an egg, shell piercing fingers pivotally mounted on the egg retaining members, shaft members projecting from said retaining members, links operably connecting the sleeves with the fingers, means for sliding the sleeves on the shafts to actuate the fingers for piercing the shell of the egg, and means for withdrawing the fingers from the shell.

50. The method of breaking eggs comprising inserting an egg in a pair of upwardly opened cups, pivotally closing the cups on the egg, planetating the cups in a vertical plane about the horizontal axis, piercing the shell of the egg and pivotally moving the cups to opened position to sever the shell and allow discharge of the contents of the egg while the cups are moving downwardly at one side of the axis, retaining the cups in opened position while they are moved to their original position, and ejecting the shells.

51. The method of breaking eggs comprising inserting an egg into a pair of upwardly opened cups, pivotally closing the cups on the egg, planetating the cups in a vertical plane about a horizontal axis, piercing the shell of the egg, pivotally opening the cups in the direction in which the cups are planetating to sever the shell and allow discharge of the egg contents while the cups are moving downwardly at one side of the axis, retaining the cups in opened position in the direction of planetation while they are moving to their original position, and ejecting the shells from the cups.

FRANK PILLEY.